(12) United States Patent
Zhang (10) Patent No.: US 9,529,526 B2
(45) Date of Patent: Dec. 27, 2016

(54) INFORMATION PROCESSING METHOD AND INFORMATION PROCESSING DEVICE

(71) Applicants: Beijing Lenovo Software Ltd., Haidian District, Beijing (CN); Lenovo (Beijing) Co., Ltd., Beijing (CN)

(72) Inventor: Yi Zhang, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 447 days.

(21) Appl. No.: 14/076,414

(22) Filed: Nov. 11, 2013

(65) Prior Publication Data

US 2014/0137053 A1    May 15, 2014

(30) Foreign Application Priority Data

Nov. 13, 2012    (CN) .......................... 2012 1 0454376

(51) Int. Cl.
*G06F 3/01*      (2006.01)
*G06F 3/0488*    (2013.01)

(52) U.S. Cl.
CPC .......... *G06F 3/04883* (2013.01); *G06F 3/017* (2013.01); *G06F 2203/04808* (2013.01)

(58) Field of Classification Search
CPC ......... G06F 3/017; G06F 3/04883; G06F 3/01
USPC ....................................................... 715/863
See application file for complete search history.

(56) References Cited

U.S. PATENT DOCUMENTS

| 8,479,122 | B2 | 7/2013 | Hotelling | |
|---|---|---|---|---|
| 2008/0052637 | A1* | 2/2008 | Ben-Yoseph | G06F 3/0481 715/800 |
| 2008/0297482 | A1* | 12/2008 | Weiss | G06F 3/04883 345/173 |

FOREIGN PATENT DOCUMENTS

| CN | 101198925 | 6/2008 |
|---|---|---|
| CN | 101617288 | 12/2009 |
| CN | 101630221 | 1/2010 |

OTHER PUBLICATIONS

First Office Action dated Apr. 19, 2016 out of Chinese Priority Application No. 201210454376.0 (25 pages including English translation)

* cited by examiner

*Primary Examiner* — Andrea Leggett
(74) *Attorney, Agent, or Firm* — Brinks Gilson & Lione; G. Peter Nichols (57) ABSTRACT

An information processing method and information processing device, used in an electronic device that has a display area and an operation detecting area corresponding to the display area are described. The information processing method includes detecting the gesture operation in the operation detecting area when the first operation object and the second operation objects are displayed on the display area; generating a corresponding operating instruction based on the gesture operation when the gesture operation corresponds to the first operation detecting area; performing the operation corresponding to the operating instruction to the first operation object when the operation object parameter indicates the first operation object; performing the operation corresponding to the operating instruction to the second operation object when the operation object parameter indicates the second operation object.

13 Claims, 5 Drawing Sheets

INFORMATION PROCESSING METHOD AND INFORMATION PROCESSING DEVICE

BACKGROUND

This application claims priority to Chinese patent application No. 201210454376.0 filed Nov. 13, 2012, the entire contents of which are incorporated herein by reference.

The present disclosure relates to the field of information processing, and more specifically to an information processing method and information processing device.

At present, electronic devices using touch devices (such as touch pads or touch screens) as input devices are becoming more and more popular. In such an electronic device, the user performs corresponding operations to the operation objects displayed on the electronic device by a variety of gestures, such as sliding, clicking and so on.

However, when more than one operation object is displayed on the electronic device in the manner such as nesting, stacking and the like. Typically, the user can only perform operations to objects displayed on the top-level. In other words, it is difficult for the user to perform corresponding operations to the desired objects among a plurality of the displayed objects in a way that is simple and easy to learn. Such problems are more critical in the case of electronic devices having large display size and being able to display a plurality of operation objects simultaneously.

SUMMARY

In view of the above cases, the present application provides an information processing method and an information processing device, which can make the user operate the corresponding operation objects of plurality of operation objects in the manner that is simple, easy to learn and meets the user's habit by using one gesture of a series of gestures that are different but have the same characteristics, thereby greatly improving the operating efficiency and the user experience.

According to an embodiment of the present application, an information processing method is provided, which is used in an electronic device. The electronic device has a display area and an operation detecting area corresponding to the display area. The information processing method includes: when a first operation object and a second operation objects are displayed on the display area, a gesture operation in the operation detecting area is detected. Wherein, the first operation object is displayed in the first display area of the display area, the second object is displayed in the second display area of the display area and the second display area includes the first display area. When the gesture operation corresponds to a first operation detecting area, a corresponding operating instruction is generated based on the gesture operation. Wherein, the first operation detecting area is included in the second operation detecting area, the first operation detecting area corresponds to the first operation object, the second operation detecting area corresponds to the second operation object, and the operating instruction includes an operation object parameter; and when the operation object parameter indicates the first operation object, the operation corresponding to the operating instruction is performed to the first operation object; when the operation object parameter indicates the second operation object, the operation corresponding to the operating instruction is performed to the second operation object.

According to another embodiment of the present application, an information processing device is provided, which is used in an electronic device. The electronic device has a display area and an operation detecting area corresponding to the display area. The information processing device includes: a detection unit, configured to detect the user's gesture operation in the operation detecting area when a first operation object and a second operation object are displayed on the display area, wherein the first operation object is displayed in a first display area of the display area, the second operation object is displayed in a second display area of the display area and the second display area includes the first display area; a generation unit, configured to generate the corresponding operating instruction based on the gesture operation when the gesture operation corresponds to the first operation detecting area, wherein, the first operation detecting area is included in the second operation detecting area, the first operation detecting area corresponds to the first operation object, and the second operation detecting area corresponds to the second operation object, and the operating instruction includes operation object parameter; and an execution unit, configured to perform the operations corresponding to the operation instruction to the first operation object when the operation object parameter indicates the first operation object; perform the operations corresponding to the operation instruction to the second operation object, when the operation object parameter indicates the second operation object.

In the information processing method and the information processing device of the embodiment of the present application, when a plurality of operation objects are displayed on the electronic device, the user's gesture operation is detected and the operation object desired by the user among the plurality of operation objects is determined according to the characteristic of the gesture operation, so that the operating instruction corresponding to the operation object is generated according to the gesture operation, and the operation corresponding to the operating instruction is performed.

Thus, the user can operate any operation object of a plurality of operation objects displayed on the electronic device by using a series of gestures that are different but have the same characteristic in the manner that is simple, meets operating habits, and is easy to learn, thus greatly improving the operation efficiency and improving the user experience.

DETAILED DESCRIPTION

Embodiments of the present application will be described with reference to the drawings.

First, an information processing method according to the embodiment of the present application is described with reference to FIG. 1.

The information processing method according to the embodiment of the present application is used, for example, in an electronic device. The electronic device can be portable terminals, such as mobile phones, tablet computers, notebook computers and the like, and it can also be a larger-sized terminal, such as desktop computers. The electronic device has a display unit. The display unit can be made of various materials, such as a liquid crystal element. The display unit has a display area for displaying operation object therein.

Herein, the operation object refers to the variety of objects contained (stored) in the electronic device and could be displayed on the electronic device. The operation objects as a whole form a collection of operation objects. Specifically, the operation object can be, for example, the interface of the application program and it can also be the interface of the sub-program of the application program. Further, it can also be the content of an instance of the application program. More specifically, for example, the operation object can be an image browsing application and it can also be the image opened by the image browsing application. For another example, the operation object can be a document editing application, and it can also be the document opened by the document editing application. In the case that a plurality of operation objects are displayed on the electronic device, the plurality of operation objects can be associated, such as the application program interface and the instance content. Of course, the plurality of operation objects may also be unrelated, such as the different application program interfaces.

In the following description, when it is needed to distinguish between the different operation objects, the operation object can be appropriately referred to as a first operation object, a second operation objects and the like.

Furthermore, the electronic device further has a touch input unit. The touch input unit can be made of various materials, such as a resistive touch element, a capacitive touch element and the like. The touch input unit has an operation detecting area which corresponds to the display area. In one embodiment, the touch input unit and the display unit are provided separately. For example, the touch input unit forms a touchpad. In another embodiment, the touch input unit and the display unit are provided in an overlapping manner. For example, the touch input unit and the display unit form a touch screen together.

Hereinafter, the information processing method of the embodiment of the present application is described in detail with reference to FIG. 1.

When the information processing method of the embodiment of the present application starts, at least a first operation object and a second operation objects are displayed. More specifically, the first operation object is displayed in a first display area of the display area. The second object is displayed in a second display area of the display area. The second display area includes the first display area. That is, the second display area can include the first display area and it can also be equal to the first display area.

Figure 1:
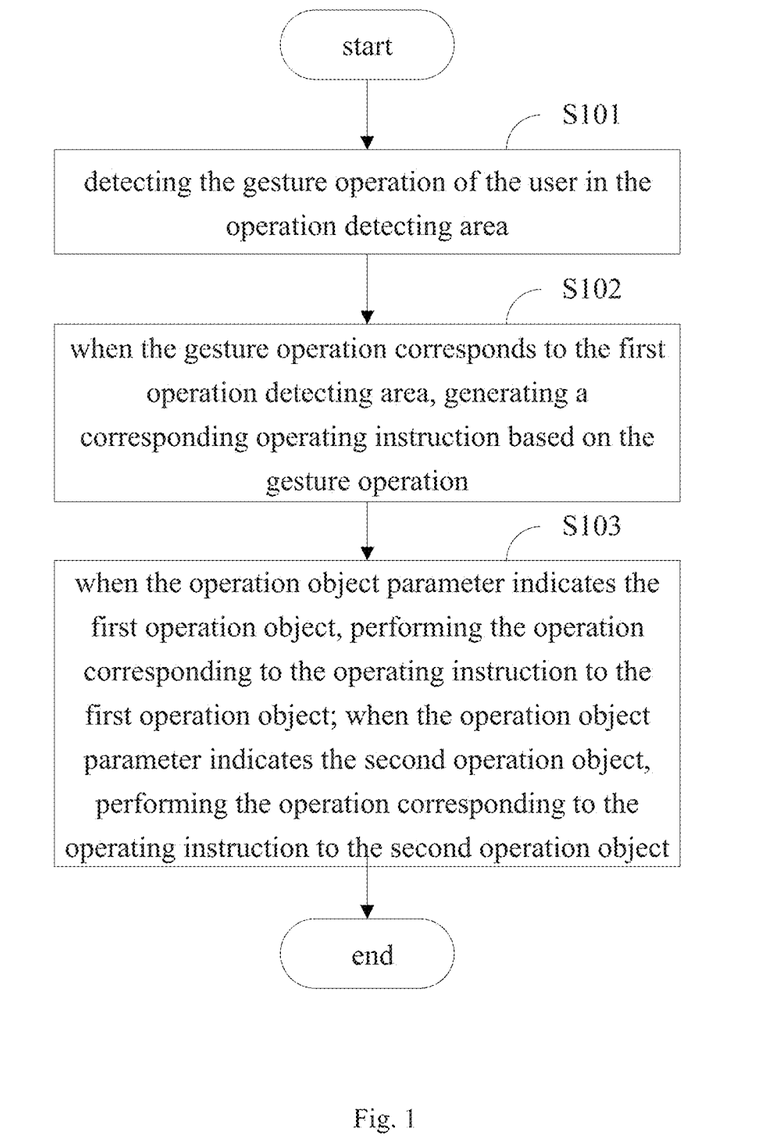
FIG. 1 is a flowchart illustrating the information processing method according to an embodiment of the present application.

At this time, as shown in FIG. 1, in step S101, firstly, the gesture operation of the user in the operation detecting area is detected. The information processing method can use a variety of known methods to detect the gesture operation, which will not be described in detail herein.

Next, in step S102, when the gesture operation corresponds to the first operation detecting area, a corresponding operating instruction is generated based on the gesture operation.

Specifically, the first operation detecting area is an operation detecting area corresponding to the first operation object. The first operation detecting area is included in a second operation detecting area. The second operation detecting area is an operation detecting area corresponding to the second operation object.

In the information processing method of the embodiment of the present application, only when the gesture operation corresponds to the first operation detecting area, an operating instruction is generated. In other words, since the first operation detecting area is contained in the second operation detecting area as described above, when the detected gesture operation is in the area of, for example, the second operation detecting area out of the first operation detecting area, the operating instruction is not generated according to the information processing method of the embodiment of the present application.

The operating instruction can be, for example, one of a display management instruction, a process (thread) management instruction and the like. The display management instruction can be, for example, a zooming-in instruction, a zooming-out instruction, a translation instruction, a rotation instruction and the like. The process (thread) management instruction can be, for example, a process (thread) start instruction, a closing instruction and the like.

Furthermore, the operating instruction can include operation object parameter for indicating the object for the operating instruction. For example, in the case that a first operation object and a second operation object are displayed on the electronic device, the operation object parameter can indicate the first operation object or the second operation object.

The operation object parameter can be determined, for example, according to the user's gesture operation.

More specifically, in one embodiment, when the detected gesture operation is a first gesture operation, a first operating instruction is generated according to the information processing method. The operation object parameter included in the first operating instruction corresponds to the first operation object. When the detected gesture operation is a second gesture operation, a second operating instruction is generated according to the information processing method. The operation object parameter included in the second operating instruction corresponds to the second operation object.

The operation type corresponding to the first operating instruction is same as the operation type corresponding to the second operating instruction. For example, the first operating instruction can be a zooming-in instruction for enlarging the first operation object and the second operating instruction can be a zooming-in instruction for enlarging the second operation object.

In addition, the first gesture operation and the second gesture operation are different but related.

More specifically, from the user's perspective, the meaning of the said "different but related" can be the first gesture operation and the second gesture operation have the same operating style or attribute. In other words, the first gesture operation and the second gesture operation can be realized in the similar operating manner. For example, the first gesture operation can be executed by the user's first part operating body (such as a first number of fingers), and the second gesture operation can be executed by the user's second part operating body (such as a second number of fingers). The first part and the second part are not exactly the same (for example, the first number and the second number are not the same).

On the other hand, from the perspective of the electronic device, the meaning of the said "different but related" is the touch point trajectory formed by the first gesture operation has the same curve characteristic as that of the touch point trajectory formed by the second gesture operation. The curve characteristic is, for example, the characteristic that can characterize the touch point trajectory, such as the direction of the touch point trajectory, the shape of the touch point trajectory and the like.

In addition, it should be noted that the touch point trajectory described herein includes not only the trajectory formed by a plurality of successive touch points (i.e. corresponding to the so-called sliding gestures), but also the trajectory formed by a number of initial touch points repeatedly appeared in a predetermined period (i.e. corresponding to the so-called double or multi-clicking gesture). In this case, the curve characteristics of the touch point trajectory can be, for example, the number of times that the initial touch points appears in a predetermined period.

According to the information processing method, the curve characteristic of the touch point trajectory can be obtained through various known methods, which will not be described in detail herein.

That is, when the touch point trajectory formed by the detected gesture operation is a first trajectory, a first operating instruction is generated according to the information processing method. When the touch point trajectory formed by the detected gesture operation is a second trajectory, a second operating instruction is generated according to the information processing method. The first trajectory and the second trajectory have the same curve characteristics, and the operation type corresponding to the first operation instruction and the operation type corresponding to the second operation instruction are the same.

For example, in above embodiment of the present application, when the number of the initial touch points in the touch point trajectory is X, a first operating instruction is generated according to the information processing method. When the number of the initial touch points in the touch point trajectory is Y, a second operating instruction is generated according to the information processing method. X and Y are natural numbers, and X<Y.

More specifically, in one embodiment, when the convergence or dispersion operation of X initial touch points is detected, a first operating instruction is generated according to the information processing method. When the convergence or dispersion operation of Y initial touch points is detected, a second operating instruction is generated according to the information processing method. Wherein, X and Y are natural numbers, and 1<X<Y.

In another embodiment, when it is detected that the X initial touch points perform the translation operation while maintaining the relative positional relationship among the X initial touch points, a first operating instruction is generated according to the information processing method. When it is detected that the Y initial touch points perform translation operation while maintaining the relative positional relationship among the Y initial touch points, a second operating instruction is generated according to the information processing method. Similarly, X and Y are natural numbers, and 1<X<Y.

In yet another embodiment, when it is detected that the X initial touch points perform the translation operation, a first operating instruction is generated according to the information processing method. When it is detected that the Y initial touch points perform translation operation while maintaining the relative positional relationship among the Y initial touch points, a second operating instruction is generated according to the information processing method. Similarly, X and Y are natural numbers, and 1=X, X<Y.

The operations of step S102 will be described in more detail with specific examples.

Next, in step S103, when the operation object parameter indicates the first operation object, the operation corresponding to the operating instruction is performed to the first operation object. On the other hand, when the operation object parameter indicates the second operation object, the operation corresponding to the operating instruction is performed to the second operation object.

For example, in the case that the interface of the image browsing application is displayed on the electronic device, the image (part) opened by the application is also displayed, and the operating instruction is a zooming-in instruction, when the operation object parameter indicates the image, the information processing method performs the zooming-in operation to the image, so that the image can be enlarged to make the details of the image more clear, while the size of the image browsing application remains the same. On the other hand, when the operation object parameter indicates the interface of the image browsing application, the information processing method performs the zooming-in operation to the interface so that the size of the application interface can be enlarged to display more information of the image, which is not displayed due to the size of the interface, while the image proportion is maintained.

Of course, the above operating instructions and the operation object indicated by the operation object parameter are examples only. Those skilled in the art can perform various operations to other objects, which are all included within the scope of the present application and will not be described in detail.

Further, the correspondence between the operation type of the above operating instruction and the gesture operation of the user can be, for example, previously set and stored in the electronic device.

Further, in the above-described information processing method of the embodiment of the present application, a case wherein two operation objects including the first operation object and the second operation object are displayed on the electronic device is described. However, the present application is not limited thereto. Instead, it can be applied to a case where a plurality of operation objects are displayed on the electronic device. The plurality of operation objects can be displayed in the nested, partly overlapping or whole overlapping manner.

That is, in this case, a third operation object is also displayed in the third display area of display area. The third display area, for example, includes the second display area. At this time, when the detected gesture operation is the third gesture operation, a third operating instruction is generated according to the information processing method. The operation object parameter contained in the third operating instruction corresponds to the third operation object.

Thus, when the operation object parameter corresponds to the third operation object, the operation corresponding to the operation type parameter is performed to the third operation object according to the information processing method.

In this case, the first gesture operation, the second gesture operation and the third gesture operation are different but related. Further, the operation types corresponding to the first operating instruction, the second operating instruction and the third operating instruction are the same.

Thus, in the case that a plurality of operation objects are displayed on the electronic device, the user can input though one of a plurality of gesture operations, which are different but have the same operation characteristics (operation parameter). Accordingly, according to the information processing method of the embodiment of the present application, the gesture can be detected to determine one operation object among the plurality of operation objects and the operation corresponding to the gesture can be performed to the operation object.

That is, in the embodiment of the present application, the collection of the operation objects stored in the electronic device can be divided into different levels according to the display relationship among the operation objects. On the other hand, the gesture operations can also be divided into different levels according to the operation parameters. The level of the operation object and the level of the gesture operation are related.

The "display relationship between the operation objects" refers to, for example, the nesting relationship of the plurality of operation objects displayed on the electronic device. For example, in the case of the above-described image browsing application, the image opened by the browsing application is the first level and the interface of the image browsing application is the second level. The display relationship can also refer to the hierarchical relationship shown to the user when the plurality of operation objects are displayed on the electronic device in an overlapping manner. For example, the operation object of the top-level (such as the first application program interface) is the first level, and the operation object of the second-level (such as the second application program interface) is the second level.

The "operation parameter" refers to the operation characteristic parameter of the user's gesture operation. For example, the operation parameter can be the number of the operation bodies (such as fingers), the intensity of the gesture operation, the contact area between the operation body of the gesture operation and the electronic device and the like. For example, when the number of the fingers of the gesture operation is one, the level of the gesture operation is the first level, and when the number of the fingers of the gesture operation is two, the level of the gesture operation is the second level and so on.

As described above, the level of the operation object and the level of the gesture operation are related, therefore, in the case that the operation parameter is the number of the fingers, and the operation objects are the image opened by the image browsing application and image browsing application, for example, when the number of the finger is one, the corresponding operation is performed to the image according to the information processing method, whereas when the number of the finger is two, the corresponding operation is performed to the interface of the image browsing application according to the information processing method.

The information processing method according to the embodiment of the present application is described with reference to FIG. 1 above.

As described above, the information processing method of the embodiment of the present application can be advantageously applied to portable terminals such as mobile phones, tablet computers, notebook computers and so on. It can also be used in terminals with large sizes, such as desktop computers.

In the case of large-sized (touch display) terminals, the information processing method of the embodiment of the present application is particularly advantageous. Since large-sized (touch display) terminals have relatively large sizes and can simultaneously display a plurality of application windows (corresponding to the plurality of operation objects) in a plurality of directions so as to be operated simultaneously by multiple users and a plurality of application windows can even be displayed in each direction in the manner such as nesting, stacking and the like, the conventional operation way designed for small-sized terminals can hardly meet needs. On the other hand, if an individual operation gesture is separately designed for each of the plurality of operation objects displayed simultaneously in the conventional manner and the operation gestures do not have uniform properties, the variety of gestures are hard for the users to grasp and remember.

However, according to the information processing method of the embodiment of the present application, different operation objects displayed simultaneously can be controlled and by using gestures that are different but have the same operation style. Further, since the gestures have the same operation style and the levels of the gestures correspond the levels of the operation objects, users can not only easily learn and master the basic operation style of a series of operation gestures, but also conveniently extend according to the level of the operation object desired to be controlled in the displayed operation objects, thus greatly improving the user experience.

Specifically, in the information processing method of the embodiment of the present application, when a plurality of operation objects are displayed on the electronic device, the user's gesture operation is detected and the operation object, desired by the user, among the plurality of operation objects is determined according to the characteristic of the gesture operation, so that the operating instruction corresponding to the operation object is generated according to the gesture operation. The operation corresponding to the operating instruction is performed and the operation corresponding to the gesture operation is performed.

Thus, the user can operate any operation object among the plurality of operation objects displayed on the electronic device by using a series of gestures that are different but have the same characteristic in the manner that is simple, meets operating habits, and is easy to learn, thus greatly improving the operation efficiency and improving the user experience.

Next, referring to FIG. 2 and FIG. 3, the information processing method of the embodiment of the present application is described in detail.

FIGS. 2A-2D illustrate the display diagram of the electronic device applying the information processing method of the embodiment of the present application.

Figure 2A:
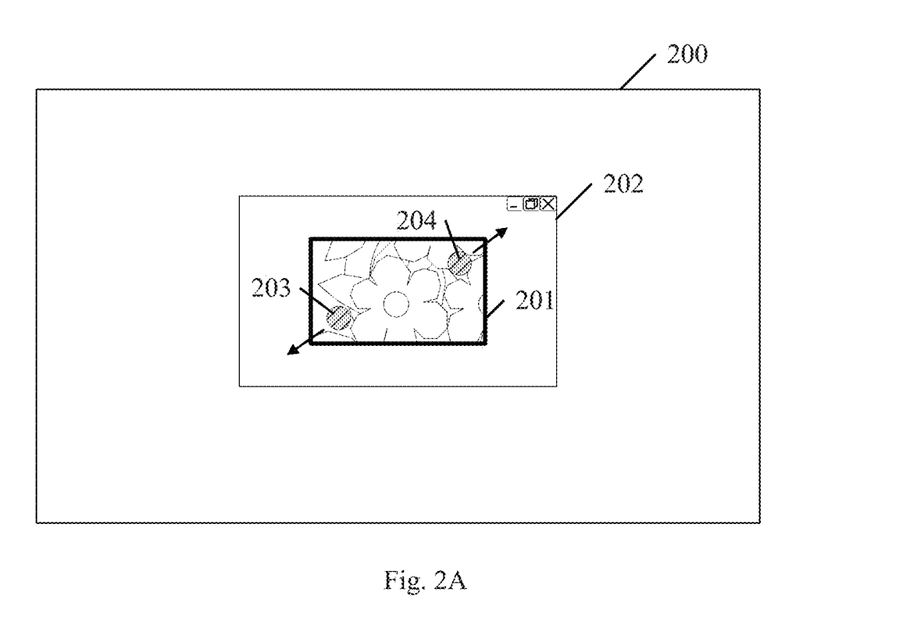
FIG. 2A is a diagram illustrating the display of the information processing device applying the information processing method according to the embodiment of the present application with a first operation object and a second operation object being displayed.

As shown in FIG. 2A, in the display area 200 of the electronic device in the embodiment of the present application, a first operation object 201 and a second operation object 202 are displayed. The second operation object 202 is, for example, the image browsing application and the first operation object 201 is, for example, the image opened by the image browsing application. The first operation object 201 is displayed in the first display area shown with a thick solid line and the second operation object 202 is displayed in the second display area shown in a thin solid line. As shown in FIG. 2A, the second display area includes the first display area.

Further, in the description of FIGS. 2A-2D, for the sake of convenience, assuming that the display area and the operation detecting area are the same, that is, the display unit of the electronic device is a touch display unit. However, those skilled in the art can understand that the display area and the operation detecting area can correspond with each other instead of being the same. This is also applicable to the following examples in FIG. 3.

In the case shown in FIG. 2A, the user's gesture operation is detected. For example, when the user, in the first display area, performs a sliding operation of moving fingers of the left and right hands far away from each other with the index finger of the left hand and the index finger of the right hand, i.e. when, for example, the detected initial touch points of the gesture operation are the touch points 203,204, as shown in FIG. 2A, and the moving directions of the touch points are shown by the arrows (in other words, when the dispersing operation of the two initial touch points 203 and 204 is detected), according to the information processing method, it can be determined, according to the gesture operation, that the type of the operating instruction is a zooming-in operation and the operation object is the image. In this case, the image is enlarged according to the information processing method, as shown in FIG. 2B.

Figure 2B:
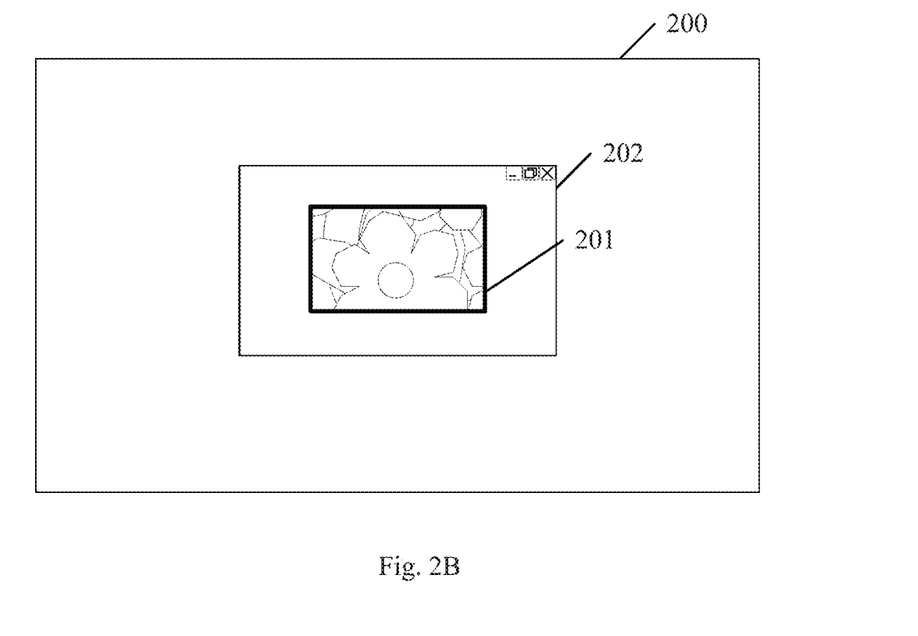
FIG. 2B is a diagram illustrating the display of the information processing device applying the information processing method according to the embodiment of the present application with the operation object enlarged.

By comparing FIG. 2A and FIG. 2B, the proportion of the first operation object 201 shown in FIG. 2B is enlarged so that the detailed characteristics of the first operation object 201 as the image can be shown clearly. Meanwhile, the size of the second operation object 202 remains unchanged.

Figure 2C:
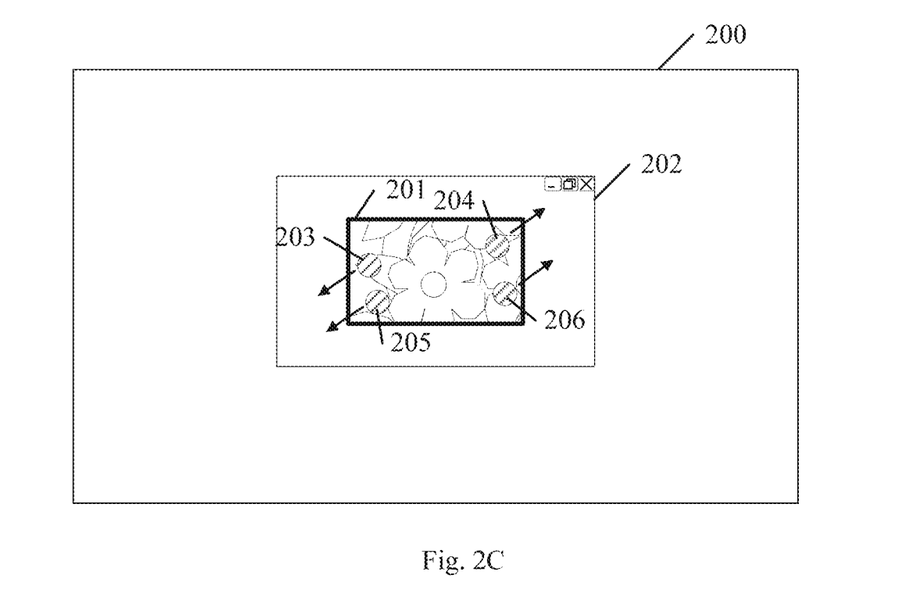
FIG. 2C is a diagram illustrating the display of the information processing device applying the information processing method according to the embodiment of the present application with a first operation object and a second operation object being displayed.

On the other hand, for example, when the user, in the first display area, performs a sliding operation of moving the fingers of the left and right hands far away from each other with the index finger and the middle finger of the left hand and the index finger and the middle finger of the right hand, i.e. when the detected initial touch points of the gesture operation are the touch points 203,204, 205 and 206 as shown in FIG. 2C, and the moving directions of the touch points are shown by the arrows, according to the information processing method, it can be determined, according to the gesture operation, that the type of the operating instruction is a zooming-in operation and the operation object is the image browsing application. In this case, the interface of the image browsing application is enlarged according to the information processing method, as shown in FIG. 2D.

Figure 2D:
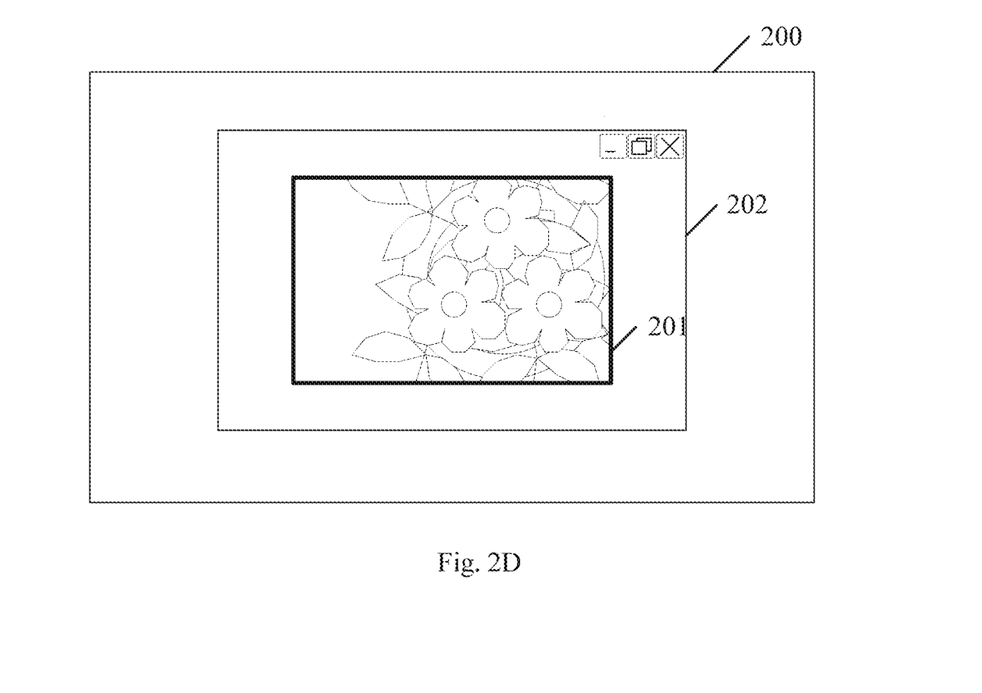
FIG. 2D is a diagram illustrating the display of the information processing device applying the information processing method according to the embodiment of the present application with the operation object enlarged.

By comparing FIG. 2C and FIG. 2D, the proportion of the second operation object 202 shown in FIG. 2D is enlarged so that other content of the first operation object 201 that was not shown due to the limitation of the application window can be clearly shown. Meanwhile, the proportion of the first operation object 201 remains unchanged.

In addition, although it is not shown, those skilled in the art can understand that when the user, for example, performs a sliding operation of moving the fingers of the left and right hands far away from each other in the first display area, with the index finger, the middle finger and the ring finger of the left hand and the index finger, the middle finger and the ring finger of the right hand, according to the information processing method, it can be determined, according to the gesture operation, that the type of the operating instruction is a zooming-in operation and the operation object is the display interface of the operating system. In this case, the display interface of the operating system is enlarged according to the information processing method.

That is, as described above, the information processing method of the embodiment of the present application is not only applicable to the case of displaying two operation objects simultaneously, but also applicable to the case of displaying more than two operation objects. The operation object can be not only an interface of a general user application, but also the interface of the operating system.

In addition, it should be noted that in the above-described zooming-in operation, in one embodiment, according to the information processing method, a zooming-in operation can be performed to, for example, the whole display interface of the operating system. In another embodiment, according to the information processing method, the part corresponding to the first display area of the display interface of the operating system is enlarged and the enlarged part can be displayed on the top level with different display effect such as different gray level and so on, so as to implement the so-called "magnifier" function.

In FIGS. 2A-2D, the case that the operation type is zooming-in instruction is explained. In this example, when the dispersion operation of X initial touch points is detected, a first operating instruction is generated according to the information processing method. When the dispersion operation of Y initial touch points is detected, a second operating instruction is generated according to the information processing method. Wherein, X and Y are natural numbers, and $1<X<Y$.

In addition, it should be noted that, in the above examples of FIGS. 2A-2D, the case of $X=2, Y=4$ has been described as an example. However, the present application is not limited thereto. Those skilled in the art can arbitrarily set the correspondence relationship between the number of X,Y and the different levels of operation objects according to the practical requirements. Alternatively, in one embodiment, for the two operation objects with adjacent levels, the number of X and Y in the operation gesture for controlling the operation object are also adjacent. For example, in the above example, it can be set that $X=2, Y=3$. Thus, the information processing method of the embodiment of the present application can better meet the user's operation habit and is convenient for the user to understand and remember.

Those skilled in the art can understand that the present application can be similarly used for operations relating to display processing, such as the zooming-out operation, the rotating operation, the translation operation and so on. It is also applicable similarly to operations related to processes (threads) such as application start, application exit and so on.

For example, also taking the above image browsing application and the displayed images as an example, when the initial touch points 203 and 204 are detected to perform the clockwise rotation operation while maintaining their relative distance, according to the information processing method, a first operating instruction is generated for clockwise rotating the image. At this time, the image is clockwise rotated. Meanwhile, the window of the image browsing application remains unchanged.

On the other hand, when the initial touch points 203 and 205 and the initial touch points 204 and 206 are detected to perform the clockwise rotation operation while maintaining their relative distance, according to the information processing method, a second operating instruction is generated for clockwise rotating the window of the image browsing application. At this time, the window of the image browsing application is clockwise rotated. Meanwhile, the display of the image remains unchanged.

That is, when X initial touch points are detected to perform the moving operation while maintaining the relative distance of the X initial touch points, a first operating instruction is generated according to the information processing method. When Y initial touch points are detected to perform the moving operation while maintaining the relative distance of the Y initial touch points, a second operating instruction is generated according to the information processing method. Wherein, X and Y are natural numbers, and 1<X<Y.

As another example, similarly taking the above-described image browsing application and the displayed image as an example, when the sliding operation, for example, of the initial touch point 203 is detected, a first operating instruction is generated for translating the image. At this time, the position of the image in the image browsing application window is translated, while the display position of the window of the image browsing application remains unchanged.

On the other hand, when the sliding operation, for example, of the initial touch point 203 and 205 is detected, a second operating instruction is generated for translating the window of the image browsing application. At this time, the position of the window of the image browsing application is translated in the display area, while the display position of the image remains unchanged.

That is, when X initial touch points are detected to perform the translation operation, a first operating instruction is generated according to the information processing method. When Y initial touch points are detected to perform the translation operation while maintaining the relative distance of the Y initial touch points, a second operating instruction is generated according to the information processing method. Wherein, X and Y are natural numbers, and 1=X, X<Y.

Figure 3A:
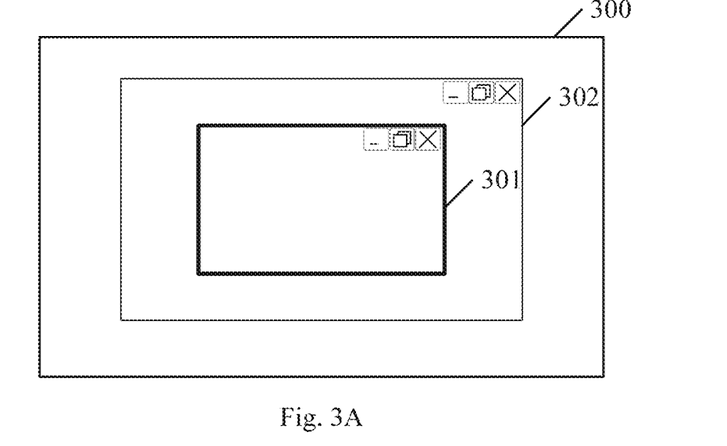
FIG. 3A is another diagram illustrating the display of the information processing device applying the information processing method according to the embodiment of the present application with a first operation object and a second operation object being displayed.
Figure 3B:
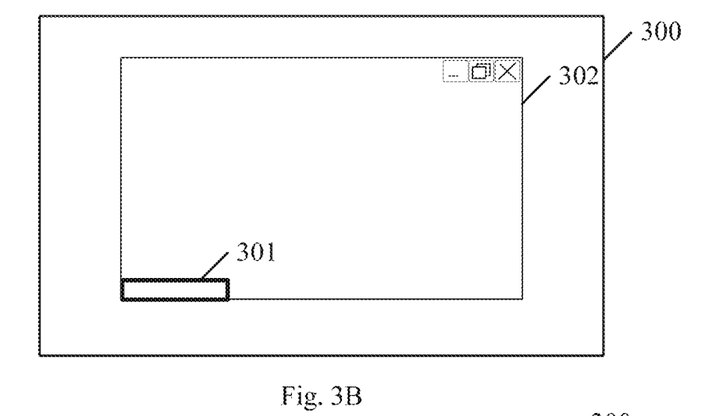
FIG. 3B is another diagram illustrating the display of the information processing device applying the information processing method according to the embodiment of the present application with the operation object minimized.
Figure 3C:
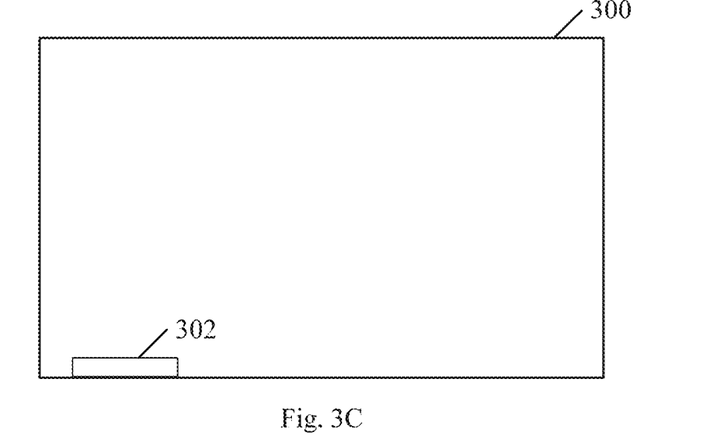
FIG. 3C is another diagram illustrating the display of the information processing device applying the information processing method according to the embodiment of the present application with the operation object minimized.

FIGS. 3A-3C illustrate another display diagram of the electronic device applying the information processing method according to the embodiment of the present application.

As shown in FIG. 3A, on the display area 300 of the electronic device in the embodiment of the present application, a first operation object 301 and a second operation object 302 are displayed. The second operation object 302 is, for example, an application program and the first operation object 301 is, for example, a subroutine of the application program. The first operation object 301 is displayed in the first display area shown with a thick solid line and the second operation object is displayed in the second display area shown in a thin solid line. As shown in FIG. 3A, the second display area includes the first display area.

In the case shown in FIG. 3A, the user's gesture operation is detected. When it is detected that the gesture operation corresponds to the first display area, for example, a double-click operation of a single initial touch point is detected in the first display area, according to the information processing method, the operating instruction is determined to be the minimizing operation and the operation object is the subroutine according to the gesture operation. In this case, according to the information processing method, the minimizing operation is performed to the subroutine, as shown in FIG. 3B.

On the other hand, for example, when the double-click operation of two initial touch points is detected in the first display area, according to the information processing method, the operating instruction is determined to be the minimizing operation and the operation object is the application program according to the gesture operation. In this case, according to the information processing method, the minimizing operation is performed to whole application program, as shown in FIG. 3C.

FIGS. 3A-3C illustrate with the example where the operation type is the minimizing instruction (i.e. the instructions for the process (thread) to hang up or turn into the background). Those skilled in the art can understand that the present application can also be applicable to the process (thread) related operations such as the application start operation, the application exit operation, the operating system sleep or the restarting operation and so on. Of course, the operation gestures illustrated in FIGS. 3A-3C can also correspond to the display related operation instructions such as zooming-in, zooming-out and so on.

Further, FIGS. 3A-3C illustrate with the example where the operation type is the double-clicking. Those skilled in the art can understand that the examples in FIGS. 3A-3C can also be applicable to other operation gestures. For example, when the user performs a V form operation in the first display area with a single finger, the curve characteristic of the gesture operation is detected to be "V" shape according to the information processing method, and according to the gesture operation, the type of the operation instruction is determined to be minimizing operation and the operation object to be the subroutine. In this case, according to the information processing method, a minimizing operation is performed to the subroutine, as shown in FIG. 3B.

On the other hand, for example, when the user performs a V form operation in the first display area with two fingers, according to the information processing method, the type of the operation instruction is determined to be minimizing operation and the operation object to be the application. In this case, according to the information processing method, the minimizing operation is performed to the whole of the application program, as shown in FIG. 3C.

That is, the correspondence relationships between the operation gestures and the operating instructions illustrated in FIG. 2 and FIG. 3 are only examples. Those skilled in the art can design different correspondence relationships between the operation gestures and the operating instructions, which are all within the scope of the present application and will not be enumerated herein. Further, as described above, the correspondence relationships between the operation gestures and the operating instructions can be stored previously in the electronic device.

In this example, when the number of the initial touch points in the touch point trajectory is X, a first operation instruction is generated according to the information processing method. When the number of the initial touch points in the touch point trajectory is Y, a second operation instruction is generated according to the information processing method. Wherein, X and Y are natural numbers, and X<Y.

It should be noted that, the examples of FIG. 2 and FIG. 3 are described with the operation parameter of the gesture operation to be the number of the fingers. However, those skilled in the art can understand that the information processing method of the embodiment of the present application can be similarly applied to the operating parameters which are, for example, the intensity of gestures, the contact area of the operation body of the gesture operation and the electronic device and so on, which will not be described in detail herein.

The information processing method according to the embodiment of the present application is described above. According to the information processing method of the embodiment of the present application, the user can operate the corresponding operation object among the plurality of operation objects in the manner that is simple and meets the user's habit by using one gesture of a series of gestures that are different but have the same characteristics, thereby greatly improving the operating efficiency and the user experience.

Next, the information processing device of the embodiment of the present application will be described with reference to FIG. 4. The information processing device is applicable to an electronic device. The electronic device has a display area and an operation detecting area corresponding to the display area.

Figure 4:
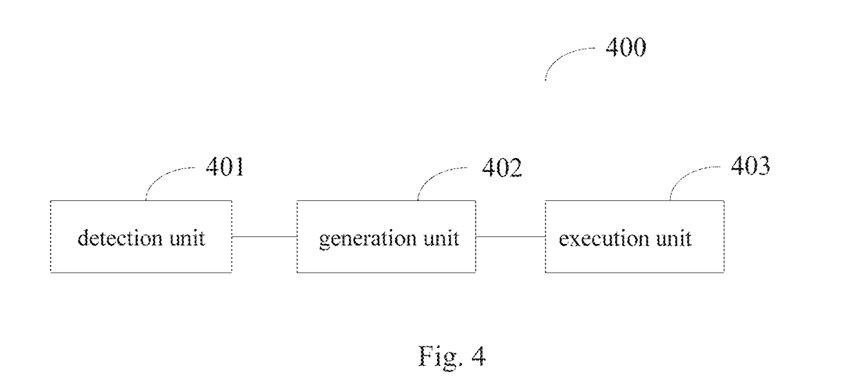
FIG. 4 is a block diagram illustrating the main configuration of the information processing device according to an embodiment of the present application.

Specifically, as shown in FIG. 4, the information processing device 400 of the embodiment of the present application includes: a detection unit 401, a generation unit 402 and an execution unit 403.

The detection unit 401 is configured to detect the user's gesture operation in the operation detecting area when a first operation object and a second operation object are displayed on the display area. Wherein, the first operation object is displayed in a first display area of the display area and the second operation object is displayed in a second display area of the display area. The second display area includes the first display area.

The generation unit 402 is configured to generate the corresponding operating instruction based on the gesture operation when the gesture operation corresponds to the first operation detecting area, wherein, the first operation detection area is included in the second operation detecting area. The first operation detecting area corresponds to the first operation object, and the second operation detecting area corresponds to the second operation object, wherein the operating instruction includes the operation object parameter.

The execution unit 403 is configured to perform the operations corresponding to the operation instruction to the first operation object when the operation object parameter indicates the first operation object, and perform the operations corresponding to the operation instruction to the second operation object when the operation object parameter indicates the second operation object.

Specifically, in one embodiment, the generation unit 402 is configured to: generate a first operating instruction when the detected gesture operation is a first gesture operation, the operation object parameter included in the first operating instruction corresponds to the first operation object; generate a second operating instruction when the detected gesture operation is a second gesture operation, the operation object parameter included in the second operating instruction corresponds to the second operation object; wherein, the first gesture operation and the second gesture operation are different but related and the operation type corresponding to the first operation instruction is the same as the operation type corresponding to the second operation instruction.

In another embodiment, a third operation object is also shown in a third display area of the display area, and the third display area includes the second display area. The generation unit 402 is configured to: generate a third operating instruction when the detected gesture operation is a third gesture operation, the operation object parameter included in the third operating instruction corresponds to the third operation object. The execution unit 403 is configured to perform the operations corresponding to the operation type parameter to the third operation object, when the operation object corresponds to the third operation object; wherein, the first gesture operation, the second gesture operation and the third gesture operation are different but related and the operation types that the first operation instruction, the second operation instruction and the third operation instruction correspond are the same.

In another embodiment, the generation unit 402 is configured to generate a first operating instruction when the touch point trajectory formed by the detected gesture operation is a first trajectory, wherein the operation object parameter included in the first operation instruction corresponds to the first operation object; generate a second operating instruction when the touch point trajectory formed by the detected gesture operation is a second trajectory, wherein the operation object parameter included in the second operation instruction corresponds to the second operation object; wherein, the curve characteristic of the first trajectory is the same as that of the second trajectory, and the operation type corresponding to the first operation instruction is the same as the operation type corresponding to the second operation instruction.

In another embodiment, the generation unit 402 is further configured to: generate a first operating instruction when the number of the initial touch points in the touch point trajectory is X; and generate a second operating instruction when the number of the initial touch points in the touch point trajectory is Y, wherein X and Y are natural numbers, and X<Y.

In another embodiment, the generation unit 402 is further configured to: generate a first operating instruction when the convergence and dispersion operations of X initial touch points are detected; generate a second operating instruction when the convergence and dispersion operations of Y initial touch points are detected; wherein, X and Y are natural numbers, and 1<X<Y; or, generate a first operating instruction when X initial touch points are detected to perform the moving operation while maintaining the relative positions of the X initial touch points; generate a second operating instruction when Y initial touch points are detected to perform the moving operation while maintaining the relative positions of the Y initial touch points, wherein X and Y are natural numbers, and 1<X<Y; or generate a first operating instruction when X initial touch points are detected to perform the moving operation; generate a second operating instruction when Y initial touch points are detected to perform the moving operation while maintaining the relative positions of the Y initial touch points, wherein, X and Y are natural numbers, and 1=X, X<Y.

The information processing device according to the embodiment of the present application is described above. With the information processing device according to the embodiment of the present application, the user can operate the corresponding operation object of the plurality of operation objects in the manner that is simple and meets the user's habit by using one gesture of a series of gestures that are different but have the same characteristics, thereby greatly improving the operating efficiency and the user experience.

The information processing device and the information processing method according to the embodiment of the present application are described above with reference to FIGS. 1 to 4.

It should be noted that, in this specification, the terms "comprising", "including" or any other variants thereof are intended to cover non-exclusive inclusion, such that the process, method, article or device including a series of elements comprise not only the elements, but also other elements that are not explicitly listed or the inherent elements of the process, method, articles or devices. In the case where there is no more restrictions, the element defined by the statement "includes a . . . " does not exclude the case where there are other identical elements that are included in the process, method, article or device that include the said element.

Finally, it should be noted that the above series of processes include not only the processing order described herein performed in time series, but also in parallel or separately instead of the processing executed in time series.

Through the above description of the embodiments, those skilled in the art can clearly understand the present application may be accomplished by software plus necessary hardware platform. Of course, it can also be implemented wholly by hardware. Based on this understanding, the contribution of the technical solution of the present application to the prior art can be embodied all or partly by software products. The computer software products could be stored in the storing medium such as ROM/RAM, magnetic disc, CD and so on, and include several instructions that can make a computing device (which can be personal computers, servers or network devices and so on) perform the method described by part of the embodiment or each embodiment of the present application.

In the embodiments of the present application, the cell/module may be implemented by software so as to be performed by various types of processors. For example, an identified executable code module may include one or more physical or logical blocks of the computer instructions. For example, it can be constructed as an object, process, or function. Nevertheless, the executable codes of the identified module do not need to be physically located together. Instead, they can include different instructions stored in different positions. When these instructions are logically combined, they constitute units/modules and implement the intended purpose of the unit/module.

When the unit/module can be implemented by using software, taking into account the level of existing hardware technology, the unit/modules that can be implemented by software, and without considering the costs, they can be implemented by those skilled in the art through setting up corresponding hardware circuit. The hardware circuit includes conventional very-large scale integration (VLSI) circuits or gate arrays, and conventional semiconductor such as logic chips, transistors and the like or other discrete components. Modules can also use programmable hardware devices, such as field programmable gate arrays, programmable array logic, programmable logic devices or the like.

The present application has been described in detail above. Herein, specific examples are used to elaborate the principles and implementations of the present application. The description of the above embodiments is only to help to understand the method and the core idea of the present application; meanwhile, for those skilled in the art, according to the ideas of the present application, the specific implementation and the application scope may vary. In conclusion, the content of the specification should not be understood as limiting the application.

The invention claimed is:

1. An information processing method, used in an electronic device that has a display area and an operation detecting area corresponding to the display area, the information processing method comprising:

detecting a gesture operation in the operation detecting area when a first operation object and a second operation objects are displayed on the display area, wherein the first operation object is displayed in a first display area of the display area, the second operation object is displayed in a second display area of the display area and the second display area includes the first display area;

generating a corresponding operating instruction based on the gesture operation when the gesture operation corresponds to the first operation detecting area, wherein the first operation detecting area is included in the second operation detecting area, the first operation detecting area corresponds to the first operation object, the second operation detecting area corresponds to the second operation object, and the operating instruction includes operation object parameter; and performing the operation corresponding to the operating instruction to the first operation object when the operation object parameter indicates the first operation object; performing the operation corresponding to the operating instruction to the second operation object when the operation object parameter indicates the second operation object, wherein the generating a corresponding operating instruction comprises:

generating a first operating instruction when the detected gesture operation is a first gesture operation, the operation object parameter included in the first operating instruction corresponding to the first operation object;

generating a second operating instruction when the detected gesture operation is a second gesture operation, the operation object parameter included in the second operating instruction corresponding to the second operation object;

wherein the first gesture operation and the second gesture operation are different but related, and the operation type corresponding to the first operation instruction is the same as the operation type corresponding to the second operation instruction.

2. The information processing method according to claim 1, wherein a third operation object is also displayed in a third display area of display area and the third display area includes the second display area;

the generating the corresponding operation instruction comprising:

generating a third operating instruction when the detected gesture operation is a third gesture operation, the operation object parameter contained in the third operating instruction corresponding to the third operation object; and the information processing method further comprising:

performing the operation corresponding to the operation type parameter to the third operation object when the operation object parameter corresponds to the third operation object, wherein, the first gesture operation, the second gesture operation and the third gesture operation are different but related and the operation types corresponding to the first operating instruction, the second operating instruction and the third operating instruction are the same.

3. The information processing method according to claim 1, wherein the generating a corresponding operating instructions comprising:

generating a first operating instruction when the touch point trajectory formed by the detected gesture operation is a first trajectory, the operation object parameter included in the first operation instruction corresponding to the first operation object;

generating a second operating instruction when the touch point trajectory formed by the detected gesture operation is a second trajectory, the operation object parameter included in the second operation instruction corresponding to the second operation object;

wherein, a curve characteristic of the first trajectory is the same as that of the second trajectory, and the operation type corresponding to the first operation instruction is the same as the operation type corresponding to the second operation instruction.

4. The information processing method according to claim 3, wherein the generating a corresponding operating instruction comprising:

generating a first operating instruction when the number of the initial touch points in the touch point trajectory is X; and generating a second operating instruction when the number of the initial touch points in the touch point trajectory is Y, wherein, X and Y are natural numbers, and X<Y.

5. The information processing method according to claim 1, the generating a corresponding operating instruction based on the gesture operation comprising:

generating a first operating instruction when the convergence and dispersion operations of X initial touch points are detected; generating a second operating instruction when the convergence and dispersion operations of Y initial touch points are detected; wherein X and Y are natural numbers, and 1<X<Y;

or generating a first operating instruction when X initial touch points are detected to perform the moving operation while maintaining the relative positions of the X initial touch points; generating a second operating instruction when Y initial touch points are detected to perform the moving operation while maintaining the relative positions of the Y initial touch points, wherein X and Y are natural numbers, and 1<X<Y;

or generating a first operating instruction when X initial touch points are detected to perform the moving operation; generating a second operating instruction when Y initial touch points are detected to perform the moving operation while maintaining the relative positions of the Y initial touch points, wherein X and Y are natural numbers, and 1=X, X<Y.

6. The information processing method according to claim 1, wherein
the operating instruction comprises at least one of a display management instruction and a process management instruction.

7. The information processing method according to claim 1, wherein
the second operation object is the interface of an application program and the first operation object is the interface of the sub-program running in the application program or the content of an application instance.

8. The information processing method according to claim 1, wherein,
a collection of operation objects, which at least comprises the first operation object and the second operation object, is stored in the electronic device and the operation object collection is divided into different levels according to the display relationship among the operation objects;

the gesture operations correspond to an operation parameter and the gesture operations are divided into different levels according to the operation parameter;

the levels of the operation objects and the levels of the gesture operations are related.

9. An information processing device, used in a electronic device that has a display area and an operation detecting area corresponding to the display area, the information processing device comprising a processor configured to:

detect the user's gesture operation in the operation detecting area when a first operation object and a second operation object are displayed on the display area, wherein the first operation object is displayed in a first display area of the display area, the second operation object is displayed in a second display area of the display area and the second display area includes the first display area;

generate the corresponding operating instruction based on the gesture operation when the gesture operation corresponds to the first operation detecting area, wherein the first operation detection area is included in the second operation detecting area, the first operation detecting area corresponds to the first operation object, and the second operation detecting area corresponds to the second operation object, and the operating instruction includes operation object parameter; and perform the operations corresponding to the operation instruction to the first operation object when the operation object parameter indicates the first operation object; perform the operations corresponding to the operation instruction to the second operation object, when the operation object parameter indicates the second operation object, wherein the processor is configured to:

generate a first operating instruction when the detected gesture operation is a first gesture operation, the operation object parameter included in the first operating instruction corresponding to the first operation object;

generate a second operating instruction when the detected gesture operation is a second gesture operation, the operation object parameter included in the second operating instruction corresponding to the second operation object;

wherein the first gesture operation and the second gesture operation are different but related, and the operation type corresponding to the first operation instruction is the same as the operation type corresponding to the second operation instruction.

10. The information processing device according to claim 9, wherein a third operation object is also displayed in the third display area of display area and the third display area includes the second display area;

the processor is configured to:

generate a third operating instruction when the detected gesture operation is a third gesture operation, the operation object parameter contained in the third operating instruction corresponding to the third operation object; and perform the operation corresponding to the operation type parameter to the third operation when the operation object parameter corresponds to the third operation object, wherein, the first gesture operation, the second gesture operation and the third gesture operation are different but related and the operation types corresponding to the first operating instruction, the second operating instruction and the third operating instruction are the same.

11. The information processing device according to claim 9, wherein the processor is configured to generate a first operating instruction when the touch point trajectory formed by the detected gesture operation is a first trajectory, the operation object parameter included in the first operation instruction corresponding to the first operation object;

generate a second operating instruction when the touch point trajectory formed by the detected gesture operation is a second trajectory, the operation object parameter included in the second operation instruction corresponding to the second operation object;

wherein, a curve characteristic of the first trajectory is the same as that of the second trajectory, and the operation type corresponding to the first operation instruction is the same as the operation type corresponding to the second operation instruction.

12. The information processing device according to claim 11, wherein the processor is further configured to generate a first operating instruction when the number of the initial touch points in the touch point trajectory is X; and generate a second operating instruction when the number of the initial touch points in the touch point trajectory is Y, wherein, X and Y are natural numbers, and X<Y.

13. The information processing device according to claim 9, wherein the processor is further configured to generate a first operating instruction when the convergence and dispersion operations of X initial touch points are detected; generate a second operating instruction when the convergence and dispersion operations of Y initial touch points are detected; wherein X and Y are natural numbers, and 1<X<Y;

or generate a first operating instruction when X initial touch points are detected to perform the moving operation while maintaining the relative positions of the X initial touch points; generate a second operating instruction when Y initial touch points are detected to perform the moving operation while maintaining the relative positions of the Y initial touch points, wherein X and Y are natural numbers, and 1<X<Y;

or generate a first operating instruction when X initial touch points are detected to perform the moving operation; generate a second operating instruction when Y initial touch points are detected to perform the moving operation while maintaining the relative positions of the Y initial touch points, wherein X and Y are natural numbers, and 1=X, X<Y.

* * * * *